United States Patent

[11] 3,596,170

[72] Inventors Hiro Moriyasu
Portland;
Hideki Iwata, Beaverton, both of, Oreg.
[21] Appl. No. 857,365
[22] Filed Sept. 12, 1969
[45] Patented July 27, 1971
[73] Assignee Tektronix, Inc.
Beaverton, Oreg.

[54] CIRCUIT FOR REGULATING PEAK VALUES OF AN AC WAVE
11 Claims, 3 Drawing Figs.

[52] U.S. Cl. .................................................. 323/17,
307/253, 321/18, 323/22 T
[51] Int. Cl. .................................................. G05f 1/44
[50] Field of Search .......................................... 307/237,
253, 257; 323/4, 9, 19—22, 22 T, 17, 24, 93;
321/18

[56] References Cited
UNITED STATES PATENTS
3,287,623 11/1966 Valancius ................... 323/22 (T)
3,448,371 6/1969 Boymel ..................... 323/24 X
3,470,444 9/1969 Bixby ....................... 323/24 UX
OTHER REFERENCES
Principles Of Control Systems Engineering by Del Toro and Parker Pub; McGraw-Hill 1960 Pages 1— 9 relied upon. Copy in Art Unit 212

Primary Examiner—Gerald Goldberg
Attorney—Buckhorn, Blore, Klarquist and Sparkman ABSTRACT: A peak-to-peak regulator is coupled in series between an AC power source and the primary of an AC transformer. Another winding on the same transformer is employed to detect when peak values of the AC wave exceed a predetermined value, and negative feedback in response thereto increases the impedance of the regulator. Positive feedback circuitry is included which detects an increase in voltage drop across the regulator and which in response thereto further enhances or aids the negative feedback. As a result, the current through the regulator is minimized for the duration of the peak of the AC wave which it regulates.

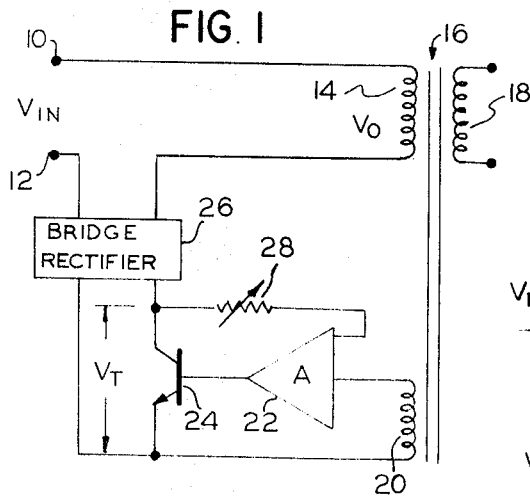
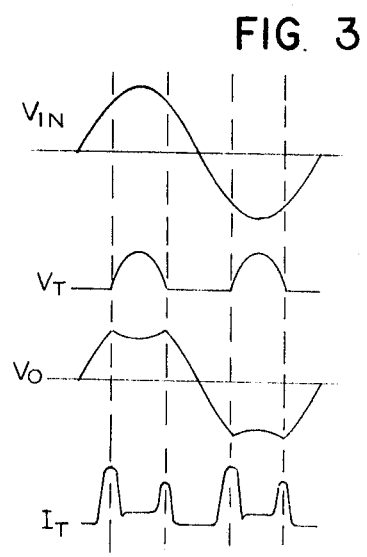
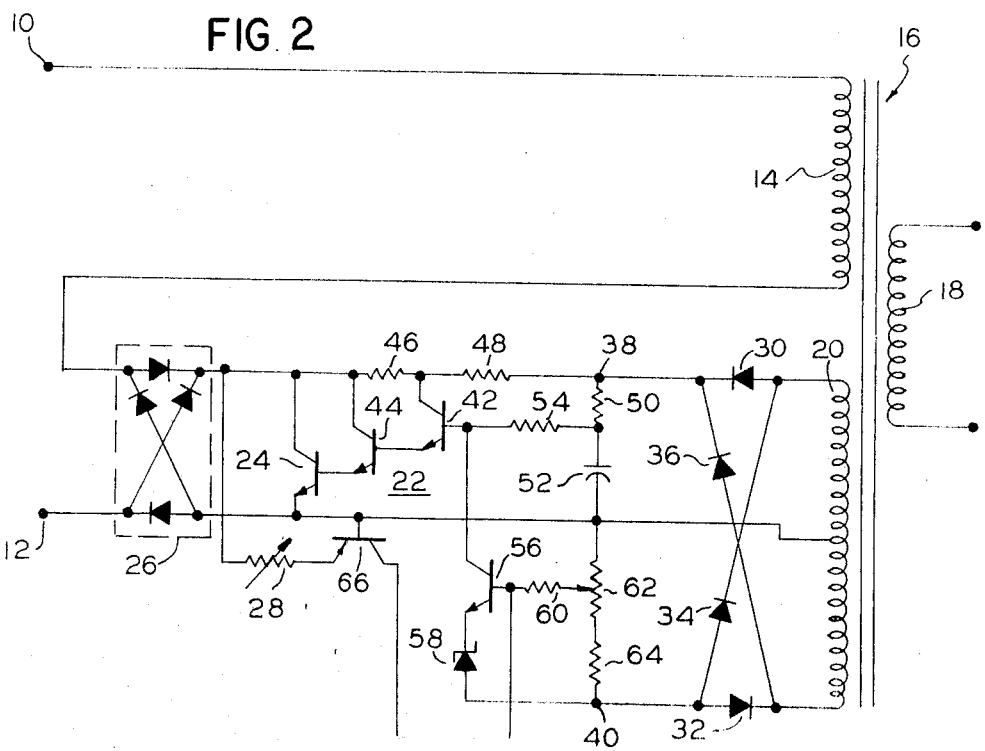
HIRO MORIYASU
HIDEKI IWATA
INVENTORS.
BY
BUCKHORN, BLORE, KLARQUIST & SPARKMAN
ATTORNEYS

CIRCUIT FOR REGULATING PEAK VALUES OF AN AC WAVE

BACKGROUND OF THE INVENTION

Peak-to-peak primary regulators are advantageously employed in the primary circuit of a power supply transformer and operate to reduce or eliminate peak voltages that would otherwise be applied to the transformer primary. A voltage across a transformer winding is suitably compared with a predetermined value, and when the AC voltage peak exceeds this value, the impedance of the regulator is increased. The excessive line voltage then appears across the regulator. Therefore, the peak-to-peak absolute value of an output voltage can be held nearly constant. As a result, the bulk of components such as transformers, capacitors, rectifier circuits and the like can be reduced since they will not be subjected to high line voltages.

However, the regulator in the above-described circuit dissipates power as voltage exceeds the desired peak value, resulting in low efficiency. Also, the regulator and its surroundings must be capable of withstanding this power dissipation. Moreover, the r.m.s. output of the transformer changes as more and more clipping of the AC wave peaks takes place, even though the peak-to-peak value is constant. Consequently, heater voltages, pilot lamp voltages, and the like, derived from a transformer are still subject to input voltage fluctuations.

SUMMARY OF THE INVENTION

According to the present invention, a variable impedance control means or regulator is coupled in series with the AC line, and its impedance is changed in response to the detected peaks of the AC wave. However, in addition, the regulator circuit is provided with positive feedback so that once the voltage across the variable impedance control means increases as the voltage peak is detected, the input to the variable impedance control means is further increased. As a result, the voltage across the AC line beyond the regulator is actually reduced after the voltage first exceeds a predetermined peak value. Hence, a more constant r.m.s. voltage output is produced. Furthermore, the current through the regulator is decreased after a peak voltage value is reached, and the dissipation across the variable impedance control means is considerably reduced. Thus, peak current through the control means does not occur as the voltage thereacross reaches its maximum value. Therefore, the power dissipated in the control means is reduced, resulting in greater efficiency and less stringent requirements on regulator components.

It is therefore an object of the present invention to provide apparatus for more efficiently regulating the peak-to-peak value of an AC wave.

It is a further object of the present invention to provide an improved AC peak-to-peak regulator providing a more constant r.m.s. output voltage.

It is a further object of the present invention to provide an improved AC peak-to-peak regulating circuit wherein the voltage and current maxima do not occur in the regulator at the same time.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a block diagram of a regulating circuit according to the present invention;

FIG. 2 is a schematic diagram of the same regulator circuit according to the present invention; and FIG. 3 is a chart of waveforms illustrating operation of the circuit according to the present invention.

DETAILED DESCRIPTION

Referring to FIG. 1, an AC input voltage $V_{IN}$ is provided between input terminals 10 and 12. Input terminal 10 is connected to one end of a primary winding 14 on transformer 16 across which a voltage $V_o$ is developed. Transformer 16 further includes a secondary winding 18 for supplying a load such as a rectifier and filter circuit for producing a DC output, and transformer 16 is also provided with a sensing winding 20 across which a negative feedback voltage is developed. One end of winding 20 is coupled to amplifier 22 forming part of a negative feedback circuit, the output of amplifier 22 being applied to the control terminal of a regulator control device, here comprising the base of regulating transistor 24. A threshold or comparison device is suitably incorporated in the circuit such that the voltage on winding 20 must exceed a predetermined value before amplifier 22 is operated.

The emitter of transistor 24 is connected to the remaining end of winding 20 and to bridge rectifier 26, while the collector of transistor 24 is connected to bridge rectifier 26. The input terminals of bridge rectifier 26 are connected in series with the AC line, i.e. respectively to input terminal 12 and the remaining end of winding 14. Bridge rectifier 26 is connected in the usual fashion such that the voltage across the collector and emitter terminals of transistor 24 is unilateral or DC despite the fact that the input terminals of the bridge rectifier are connected in series with an AC line. Voltage $V_T$ is the voltage between the collector and emitter of transistor 24 at the output of the bridge rectifier.

As thus far described, the circuit effectively places transistor 24 in series with the AC line via bridge rectifier 26. If the voltage level $V_o$ becomes excessive, winding 20 applies a sufficient voltage to amplifier 22 for causing amplifier 22 to produce an inverted output. As the voltage across winding 20 increases, amplifier 22 drives the base of transistor 24 in a negative direction causing the effective impedance of transistor 24 which is effectively in series with the AC line to increase, so the voltage across transistor 24 increases. The voltage $V_o$ will decrease.

As a result of the type of operation as thus far described, the voltage $V_o$ will not increase beyond a predetermined peak value. If peaks of the AC input wave exceed this value, amplifier 22 will be operated for increasing the impedance of transistor 24 whereby the undesired peak is eliminated and the AC wave becomes substantially flat topped. Transistor 24 is effectively a variable impedance control device. The negative feedback arrangement including amplifier 22 thus prevents the peak of the AC waveform exceeding a selected value.

However, in accordance with the present invention, the circuit is further provided with positive feedback for aidin or assisting the negative feedback function. This positive feedback is exemplified in FIG. 1 by a variable resistor 28 connected between the collector of transistor 24 and a second input of amplifier 22. In accordance with operation of the circuit according to the present invention, as a peak value on the AC input wave is reached and detected by winding 20, the voltage across transistor 24 increases. However, the increased voltage across transistor 24 is coupled via a variable resistor 28 to the second input of amplifier 22. As a consequence, amplifier 22 further increases the impedance of transistor 24 whereby the voltage $V_T$ thereacross becomes greater in value. The increased voltage is coupled back to the input of amplifier 22 via resistor 28, and so on. As a consequence, the current through transistor 24 is greatly reduced, and the transistor operates in nearly a switching mode such that the current through transistor 24 is at a minimum value while the voltage $V_T$ thereacross is maximum, thus decreasing power dissipation in the transistor.

The condition of increased voltage drop and reduced current through transistor 24 will continue until the voltage $V_{IN}$ drops below the objectionable peak value, and bridge rectifier 26 causes a reduction in the voltage $V_T$. The input applied to amplifier 22 via resistor 28 will then drop, and the condition reverses such that the circuit returns to a condition responsive to the next half-cycle of the AC wave.

The operation of the circuit is further illustrated in the waveform chart of FIG. 3 wherein the voltages are as hereinbefore defined, and the current $I_T$ is the current to transistor 24. It is assumed the region between the first two vertical dashed lines in FIG. 3 on the waveform of the voltage $V_{IN}$ is an objectionable peak value or a higher peak value than the transformer 16 and related components are designed to accept. Prior to this time, line current flows through transistor 24 and voltage $V_T$ is low. As the voltage $V_{IN}$ reaches the aforementioned peak value, the circuit operates as hereinbefore described such that a substantial voltage, $V_T$, is now developed across transistor 24. However, as a consequence of the positive feedback through resistor 28, the current $I_T$ is reduced during the period of the objectionable peak value in $V_{IN}$. Hence power dissipation in transistor 24 is limited. Also, the voltage $V_o$ applied across winding 14 is reduced or dips at this time as illustrated in FIG. 3. As a consequence of the reduction in voltage $V_o$, the r.m.s. value of the AC wave present on winding 18, for example, can be maintained at a more nearly constant value. Tube heaters, pilot lamps, and the like will then operate with a substantially constant output despite changes in the voltage magnitude of the alternating current input wave.

Thus, as a consequence of a positive feedback, a reduction in current through transistor 24 and a reduction in voltage $V_o$ applied at the primary winding 14 of transformer 16 are both possible, whereas without the positive feedback, the negative feedback provided by amplifier 22 is only capable of reducing the voltage $V_o$ and the current $I_T$ to the point where an excess is no longer detected by winding 20. The addition of the positive feedback results in operating transistor 24 in the increased voltage and reduced current state. The circuit thus proceeds beyond the point of leveling the input waveform and until the input current is almost turned off. The circuit then recovers as a consequence of the reduction in the value of the AC input itself in the same half-cycle.

A more complete circuit according to the present invention is illustrated in FIG. 2 wherein similar components are referred to employing like reference numerals. Sensing winding 20 is center tapped and a bridge rectifier comprising diodes 30, 32, 34, and 36 is coupled across the outer terminals of the winding. The bridge rectifier is connected in a conventional manner to provide a DC potential positive at terminal 38 with respect to terminal 40 in response to the AC input detected by winding 20. The bridge rectifier thus changes the indication from winding 20 to a DC value, and also functions as a power supply for part of the circuit including transistors 42 and 56. Transistor 42 receives current through resistor 48 and transistor 56 receives current through resistors 50 and 54. Capacitor 52, coupled from the midpoint between resistors 50 and 54 to the center tap of winding 20, suppresses noise.

Amplifier 22 includes NPN transistors 42 and 44 connected in driving relation in a Darlington circuit with regulating transistor 24. Thus, the emitter of transistor 42 is connected to the base of transistor 44, and the emitter of transistor 44 is connected to the base of transistor 24. The collector and emitter of transistor 24 are connected across the output of bridge rectifier 26 as before. The collector of transistor 44 is connected to the collector of transistor 24, and the resistor 46 is interposed between the collectors of transistors 42 and 44. Resistor 48 connects the collector of transistor 42 to terminal 38.

Resistor 50 and capacitor 52 are coupled in series in that order between terminal 38 and the center tap of winding 20, with the base of transistor 42 being coupled to the midpoint between components 50 and 52 through resistor 54. A further transistor 56 has its collector connected to the base of transistor 42, and its emitter coupled via Zener diode 58 to terminal 40. A resistor 60 connects the base of transistor 56 to the movable tap on a potentiometer 62, wherein the last-mentioned potentiometer is disposed between the center tap of winding 20 and a resistor 64 connecting the potentiometer to terminal 40. Transistor 56 and Zener diode 58 provide a voltage comparison circuit.

As thus far described, the circuit operates with negative feedback such that an excessive peak value of the AC wave provided at terminals 10 and 12 is detected by winding 20 and rectified by the bridge rectifier, 30, 32, 34, 36. The transistor 56 will be substantially nonconducting until such time as its base rises above the voltage of Zener diode 58. If the peak value of the wave developed at winding 20 and applied to the base of transistor 56 by way of potentiometer 62 exceeds this voltage, then the voltage at the collector of transistor 56 will drop. The voltage for potentiometer 62 is provided principally from the lower half of winding 20.

Transistors 42 and 44 normally supply sufficient current to transistor 24 such that the latter is normally in a heavily conducting state. However, when the voltage at the collector of transistor 56 drops, this drop is amplified current-wise, and the current provided at the base of transistor 24 is reduced such that the voltage across transistor 24 increases. Thus, any peak voltage occurring in the AC wave would be substantially flattened by the circuit thus far described.

Further included in the circuit according to the present invention, however, is a transistor 66 having its base connected to the emitter of transistor 24 and having its emitter coupled to the collector of transistor 24 by way of positive variable feedback resistor 28. The collector of transistor 66 is connected to the base of transistor 56. Then, as the voltage across transistor 24 increases, this increase is coupled to the base of transistor 56 causing the voltage to drop further at the collector of transistor 56. As a consequence, the voltage across transistor 24 increases, and so on. Therefore, a further reduction in current through transistor 24 and a reduction in voltage across winding 14 takes place, with the attendant advantages mentioned above. Resistor 28 adjusts positive feedback.

The voltage across transistor 24 increases, and current therethrough is substantially reduced until such time as the voltage between terminals 10 and 12 reduces to the point where the voltage applied to transistor 66 via resistor 28 declines in value as the half cycle of AC voltage concludes. This causes a reduction in voltage at the base of transistor 56, which, in conjunction with a reduction in voltage at the base of transistor 56 as delivered from winding 20, whereby causes the voltage at the base of transistor 56 to reduce once more below the voltage of Zener diode 58. The circuit is thereby returned to its initial condition and is capable of detecting the peak voltage of the next half-cycle.

While we have shown and described a preferred embodiment of our invention, it will be apparent to those skilled in the art that many changes and modifications may be made without departing from our invention in its broader aspects.

We claim:

1. A circuit for regulating peak values of an AC wave as delivered on an AC line from a supply, said circuit comprising:
    a variable impedance control means coupled in series with said line, said control means comprising principal terminals coupled to said line and a control element adapted to vary the impedance between said principal terminals,
    a means for sensing voltage peaks of said AC wave on said line beyond said control means,
    negative feedback means for coupling a sensing signal from said means for sensing to said control element for increasing the impedance of said control means as said peaks exceed a predetermined value,
    and positive feedback means coupled to aid said negative feedback means for effectively increasing the impedance change initiated by said sensing signal substantially for the duration of the period during which a said peak exceeds said predetermined value, so as to reduce the current in said control means during that time.

2. The circuit according to claim 1 wherein said variable impedance control means comprises a unilaterally conducting control device, said circuit further including a bridge rectifier coupling the principal terminals of said control device in series with said line.

3. The circuit according to claim 2 wherein said control device comprises a transistor having its collector and emitter terminals connected to said bridge rectifier.

4. The circuit according to claim 2 further including a transformer having an input winding coupled to said line beyond said control means, said transformer having an output winding, and said means for sensing voltage peaks comprising a sensing winding on said transformer and comparison circuit means for detecting when the voltage on the last-mentioned winding exceeds a predetermined value, said negative feedback means including amplifying means driving said control device for increasing the impedance thereof when the voltage on the sensing winding exceeds a predetermined value.

5. The circuit according to claim 4 wherein said positive feedback means includes a further amplifying means coupled to detect the voltage across said control device and for increasing the negative feedback provided by said negative feedback means as the voltage across said control device increases.

6. The circuit according to claim 1 wherein said positive feedback means comprises a further control means coupled to sense the voltage across said variable impedance control means and in response thereto providing an output for application to said negative feedback means for causing said negative feedback means further to increase the impedance of said control means.

7. A circuit for regulating peak values of an AC wave as delivered on an AC line from a supply, said circuit comprising:
a series control device provided with principal terminals and a control terminal,
rectifier means for coupling said line to said principal terminals of said control device,
sensing means for detecting the voltage across said line beyond said rectifier means,
negative feedback means responsive to said sensing means for increasing the voltage across said control device as the peaks of the AC wave exceed a predetermined value, said negative feedback means comprising an amplifier circuit, and positive feedback means responsive to increases in the voltage across said control device and in response thereto increasing an input to said amplifier circuit whereby further to increase the voltage across said control device for the duration of the period during which the AC wave exceeds a predetermined value.

8. The circuit according to claim 7 wherein said control device comprises a transistor, wherein said amplifier circuit comprises a first transistor amplifier, and wherein said positive feedback means comprises a further transistor amplifier.

9. The circuit according to claim 8 wherein said sensing means includes comparison means comprising a Zener diode coupled to one terminal of a transistor in said first transistor amplifier, another terminal of the same transistor being coupled to receive a signal substantially proportional to the AC wave.

10. The circuit according to claim 9 further including a transformer having a primary winding coupled to said line beyond said control device, said sensing means including a further winding on said transformer being coupled to an input of said amplifier circuit and rectification means between the said last mentioned winding and the input of said amplifier circuit.

11. The circuit according to claim 10 wherein said further winding and said rectification means are also connected to provide power for at least a portion of said amplifier circuit.